United States Patent [19]

Yau

[11] Patent Number: 5,080,942

[45] Date of Patent: Jan. 14, 1992

[54] HIGH STRETCH ELASTOMERIC PRE-STRETCHED TUBES

[75] Inventor: Steven D. Yau, Austin, Tex.

[73] Assignee: Minnesota Mining and Manufacturing Company, St. Paul, Minn.

[21] Appl. No.: 527,525

[22] Filed: May 23, 1990

[51] Int. Cl.$^5$ .................. B32B 1/08; H02G 15/08
[52] U.S. Cl. ..................... 428/349; 428/36.8; 174/DIG. 8; 174/73.1; 138/177
[58] Field of Search .......... 428/34.9, 35.1, 36.8, 428/35.8; 174/DIG. 8, 73 R, 19, 135, 801; 524/392; 138/177

[56] References Cited

U.S. PATENT DOCUMENTS

| | | | |
|---|---|---|---|
| 3,515,798 | 6/1970 | Sievert | 174/135 |
| 3,933,723 | 1/1976 | Grenness | 260/33.6 A |
| 4,303,571 | 12/1981 | Jansen et al. | 260/33.6 AQ |
| 4,363,842 | 12/1982 | Nelson | 428/36 |
| 4,517,407 | 5/1985 | Fox et al. | 174/73 R |

FOREIGN PATENT DOCUMENTS 0035271  9/1981  European Pat. Off. .

Primary Examiner—James J. Seidleck
Assistant Examiner—Charles R. Nold
Attorney, Agent, or Firm—Gary L. Griswold; Walter N. Kirn; Darla P. Neaveill

[57] ABSTRACT

Compositions and a process for manufacturing an elastomeric, low modulus pre-stretched tubular article supported by a removable core. The article has a low Shore A hardness value and a low modulus which allows a large expansion ratio and an increased wall thickness.

15 Claims, 1 Drawing Sheet

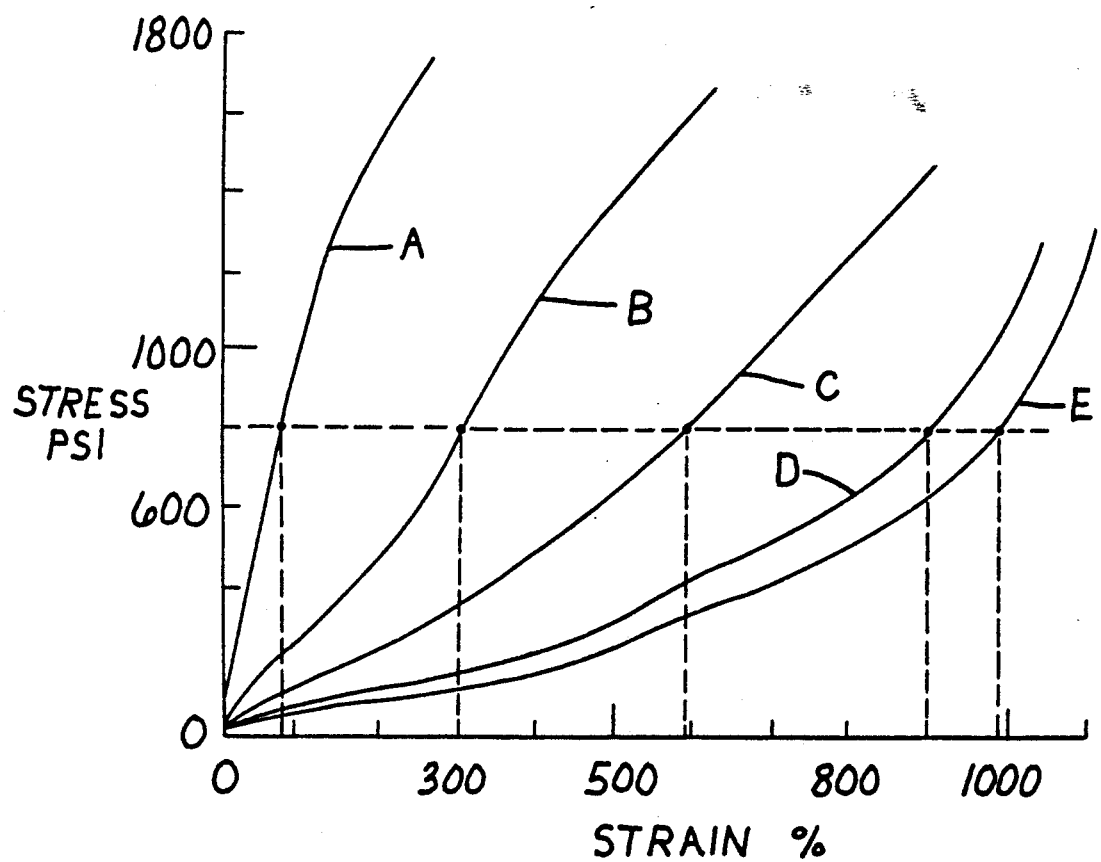

HIGH STRETCH ELASTOMERIC PRE-STRETCHED TUBES

BACKGROUND OF THE INVENTION

1. Field of the Invention

The invention relates to an elastomeric article used in the form of a pre-stretched tubular member supported by a removable core. The articles may be used for the splicing and termination of high voltage power cables as well as sleeves for sealing pipes.

2. Description Of The Prior Art

A pre-stretched tube (PST) is a tubular member which is supported in a stretched condition on a support member, usually in the form of an easily removable core. The core of the PST can be external, i.e., on the outside of the tubular member, or it can be inside the tubular member, such as is taught in U.S. Pat. No. 3,515,798, incorporated herein by reference. Preferably, the core is internal and is a one-piece rigid spiral core having interconnected adjacent coils in a closed helix configuration, as taught in U.S. Pat. No. 3,515,798.

The extent of stretching of PST is related to the hardness of the elastomeric material which is quantified by Shore A hardness values. The current PST materials generally have Shore A hardness values ranging from about 43 to about 60 and are generally limited to a maximum of about a 3 to 1 expansion ratio. Expansion over about 3:1 usually resulted in the tube splitting or tearing. Consequently, the diameter of the stretched elastomeric tube is limited to about three times the size of the tube in its unstretched condition. Further limitations are imposed by the ability of the core material to support the stretched tube without collapsing prematurely. The more the PST is expanded, the greater is the force exerted by the tube as it tries to recover. Consequently, the core must be designed to withstand this force. Where the core is designed for easy removability, there is a trade-off between its wall thickness and its ability to collapse on demand. To withstand higher forces, the wall thickness of the core must be increased. This adversely affects removability and cost of the core.

Current practice in the industry utilizes an inner plastic core which pre-stretches the tubing such that electrical cables may be inserted therein. Pre-stretched tubes on removable cores may be used in the repair of electrical cables. They are often used to protect spliced connections such that the spliced cable is threaded through a PST carrying support core which has an internal diameter larger than the outside diameter of the cable. With the PST positioned over the cable splice, the plastic core is removed allowing the stretched elastomeric material to recover, approaching its original size, so that the tubing fits snugly over the repaired section of cable.

The range of sizes, i.e., external diameters of spliced cable which may be protected by pre-stretched tubing, is limited. This limitation results from the balance which must be maintained between the recovery force exerted by the stretched elastomeric tube and the ability of the supporting core to resist crushing. The range of cable diameters to which PSTs may be applied could be extended by use of a relatively soft PST with a high expansion ratio. Therefore, a need exists for a softer elastomer, suitable for use in pre-stretched tubes, which possesses an expansion ratio larger than currently available materials. This higher ratio tubing could provide a PST for larger diameter cable and multilayer constructions suitable for high voltage applications.

The use of PST in high voltage applications has increased in recent years. Current PSTs are effective up to voltage ratings of about 600 volts. There is a need to increase this rating to as high as 5 kilovolts in high voltage applications. Also, there is a need to achieve these high voltage ratings using relatively soft rubbers such as ethylene propylene diene monomer rubber (EPDM). The dielectric strength of a rubber is also important and it is desirable to have a dielectric strength above about 450 V/mil in high voltage applications. The higher the dielectric strength of the rubber, the thinner the PST wall can be, which results in less material used and less stress on the core.

It is, therefore, an object of this invention to provide pre-stretched tubes comprised of low hardness, high expansion ratio elastomeric rubbers, supported on removable plastic cores. Another object of this invention is to provide elastomer PST compositions for use in high voltage applications.

BRIEF DESCRIPTION OF THE INVENTION

The present invention provides an article comprising an elastomeric tubular member supported in a stretched condition on an easily removable core, the tubular member comprising:

(a) about 10 to 50 weight percent of an oil-extended ethylene propylene diene monomer rubber, (b) about 5 to 25 weight percent of an elastomer selected from the group consisting of a nonoil-extended ethylene propylene diene monomer rubber and nonoil-extended ethylene propylene rubber, (c) about 5 to 15 weight percent of an extender, (d) about 10 to 30 weight percent of a processing oil, (e) about 2 to 30 weight percent of silica, and (f) up to 30 weight percent of a polymeric plasticizer.

The material has a Shore A hardness value of below about 3 and has a low modulus, which allows an expansion ratio of about 5 to 1. The modulus should be 300% stretch at below about 220 pounds per square inch. Furthermore, the elastomeric material has a voltage rating in excess of 600 V.

BRIEF DESCRIPTION OF DRAWING

FIG. 1 is a graph showing the stress-strain behavior of various EPDM rubbers.

DETAILED DESCRIPTION

The present invention has an elastic recovery whereby the tubular components almost completely recover their original dimensions after the stress is released. The rubbers of the present invention have reduced hardness when compared to prior PST elastomers. The low hardness translates into high expansion ratios, which translate to a low modulus, thus allowing the materials to be stretched or expanded to greater than about five times their original diameter. The materials exhibit good mechanical strength as well as excellent elastic memory such that they remain in a stretched state without fracture over long periods of time, and, upon removal of stress, recover quickly and almost completely. The material of the present invention may also be manufactured into PSTs and used in a multilayer capacity. Furthermore, due to the elasticity of the material, one size will cover a greater variety of cable dimensions than most currently available PSTs.

Another advantage provided by compositions of the present invention results in the application of PST constructions to larger diameter electric cables without the need for specially reinforced support structures or cores. As the elastomeric tube is radially expanded, its wall thickness decreases as the diameter of the stretched tube increases. It can be readily appreciated that soft elastomeric tubes, which stretch more easily, will expand to larger diameters than hard elastomeric tubes of the same initial wall thickness. Also, because the tube exerts less force against the supporting core, the softer elastomer may be placed over a weaker, less expensive core. Yet another benefit of the softer elastomeric tube is the opportunity to develop combinations of concentric tubular compositions, which may include hard and/or soft elastomers, so as to provide multilayer PSTs for a variety of applications.

The elastomeric material of this invention should contain from about 10 to 50 weight percent oil-extended EPDM or an oil-extended ethylene propylene rubber (EPM). More preferably, the invention should contain about 15 to 35 weight percent of an oil-extended ethylene propylene diene monomer, such as "Polysar" XC-955 available from a Polysar Incorporated. The term "oil-extended" refers to a rubber in which oil was added during polymerization. Other suitable oil-extended rubbers include "Epsyn" P597 from Copolymer Company. The oil-extended EPDM rubbers mentioned here contain 50 weight percent of paraffinic oil or naphthenic oil. Other commercially available oil-extended rubbers containing different weight percents of paraffinic oil can be used, including "Epsyn" P557 and "Epsyn" P558, both available form Copolymer Company, and "Vistalon" 3666, available from Exxon Company.

A nonoil-extended EPDM or EPM is also added in the amounts of 5 to 25 weight percent, more preferably about 10 to 12 weight percent of an EPDM or EPM rubber. Any commercially available EPDM or EPM rubber can be used, however, the preferred rubber is "Nordel" 1470, an EPDM rubber available from duPont Company.

A processing oil is also added to the mixture to soften the material. However, the use of a large amount of processing oil alone does not create a soft, expandable PST. Rather, processing oil added in large quantities greatly impairs the integrity of the polymer. Without proper compounding techniques, the resulting material will have a poor state of cure, weak mechanical and dielectric strength, poor elastic memory, and poor processibility. There are many commercially available processing oils which would be compatible with the present invention. Preferably, about 10 to 30 weight percent of a processing oil is added to the mixture. Oils which may be used include paraffinic petroleum oil, naphthenic petroleum oil, and vegetable or animal derivative oils.

In addition to the above ingredients, a source of hydrated precipitated silica or fumed silica is also necessary to achieve the desired results. Silica reinforces the strength of the rubber. There are many types of silica which are acceptable for the present invention. The percentage of silica should be about 2 to 30 weight percent, more preferably about 4 to 15 weight percent. One source of hydrated silica is "Hisil" 532 EP, available from PPG Industries Inc. Other sources of silica include "Hisil" 233, "Hisil" 210 and other fumed silicas.

Polymeric plasticizers usually are polymers in a liquid state. The amount added varies with the viscosity of the polymer. When a plasticizer is desired, preferably a polybutene, such as "Indopol" from AMOCO, and a liquid EPDM, such as "Trilene" available from Uniroyal Chemical, are used. The use of polymeric plasticizer ranges up to about 30 weight percent, preferably 3 to 10 percent.

The successful use of the present invention requires an extender to dilute the rubber, thus increasing the mechanical elongation of the cured composition. Extenders are also referred to as nonreinforcing fillers and also are added to the rubber to dilute the volume of rubber for cost reduction. Preferably, about 5 to 15 weight percent of an extender is used. Among the possible extenders include aluminum trihydrate, clay, talc, kaolin, mica, calcium carbonate, magnesium carbonate, aluminum silicate, magnesium silicate, etc.

The elastomeric material of the present invention may also contain up to about 35 weight percent of carbon black, more preferably 7 to 10 weight percent. Carbon black may consist of essentially any commercial grade, including large particulate size thermal types, fine reinforcing furnace grades, and materials termed conductive carbon black. A preferred carbon black is a coarse furnace grade (i.e., having an average particle diameter of from about 40 to about 100 nanometers). Carbon black helps achieve an effective refraction of electrical flux lines in the terminating device, yet allows maintenance of a desired level of elasticity.

Additives such as antioxidants, fungicides, organic silanes, powdered acrylics, lead oxides, zinc oxide and magnesium oxide may all be added. These include all natural, surface treated, precipitated and hydrated materials of the above.

The composition may be cured by a curing agent such as a peroxide or by exposure to ultraviolet radiation, electron beams, radio frequency, microwaves, etc. The preferred method of cure utilizes a peroxide curing agent. Possible peroxide curing agents include:
(1) dicumyl peroxide,
(2) 1,1-di(t-butyl peroxy) cyclohexane,
(3) 2,5-dimethyl-2,5-di(t-butylperoxy) hexane-3,
(4) Ethyl-3,3-di(t-butylperoxy) butyrate,
(5) 1,1-bis(t-butylperoxy),3,3,5-trimethyl cyclohexane,
(6) 2,5-dimethyl-2,5-bis(t-butylperoxy) hexane,
(7) t-butyl cumyl peroxide,
$\alpha,\alpha'$-bis(t-butylperoxy) diisopropylbenzene,
(9) n-butyl,1,4,4-bis(t-butylperoxy)valerate The optimum amount of peroxide depends on the specific peroxide used, the combination of polymeric materials, the acidity of the extenders and the amount of processing oil. EPDM rubbers may require different amounts of curative (peroxide) to yield the same degree of crosslinking. The most preferred peroxide is $\alpha,\alpha'$-bis(t-butylperoxy) diisopropylbenzene. The preferred amount is about 1 to 5 weight percent, with the most preferred amount being 2 to 3.5 weight percent.

SAMPLE PREPARATION

The material can be either mill mixed or mixed in a closed mixer such as a Banbury mixer. When mill mixed, it is preferred to use a tight nip roll with cold water running through the rolls to maintain viscosity, improve dispersion and prevent any scorching of the material. In Banbury mixing, better results may be obtained with no heating, but rather maintaining the mixer cold with cold water circulating to maintain viscosity and improve dispersion. Generally, carbon black, precipitated silica and EPDM are added first to obtain better dispersion followed by an oil-extended polymer. After thorough mixing of all ingredients, the curative (peroxide) may be added to the mixture with the temperature being maintained below the decomposition temperature of the curative to prevent any premature curing.

The composition may then be formed into a tube using a cold feed extruder. An extruder equipped with a venting port helps reduce air trapped in the feedstock which is extruded as tubing. Vulcanization of tubing can be performed in an autoclave using steam. In keeping with conventional preparation of such elastomeric materials, typical process aids, process oils, coupling agents, and vulcanizing agents may be included in the compounded elastomeric component.

As aforementioned, one of the key characteristics of the present invention is the softness of the material. The present invention has hardness values below about 33 Shore A, which generally leads to excellent flexibility and low modulus. Shore A hardness is determined according to ASTM D-2240.

Elastomeric materials used in PSTs also need to have high tensile strength, high elongation, and a low modulus. It is desirable to exhibit a tensile strength of over 1000 pounds per square inch determined using ASTM D412. The elongation should exceed 900% from the original resting length. The modulus of the materials should also be sufficiently low such that less than 220 pounds per square inch is required to elongate the sample 300%, according to ASTM D412.

The material of the present invention will generally be sold as a PST and, thus, should have an expansion ratio of greater than about 3 and preferably greater than about 5 to 1.

Elastic recovery is important so the tube fits snugly upon removal of the inner core. A desirable permanent set is less than about 20%. The elastic recovery is measured by the following method:

(1) Stabilize an oven at 100° C.
(2) Cut dumbbells from the sample to be tested using a Die C of ASTM D-412.
(3) Mark one inch (2.54 cm) bench marks at the approximate center of the sample. (Bench marks must be parallel.)
(4) Place the dumbbell in the set fixture and stretch the sample until the distance between the bench marks is 2.0 inches (5.08cm). This correlates to a 100% strain.
(5) Place the loaded set fixture in a 100° C. oven for 22 hours.
(6) After the 22 hour heat cycle, remove the fixture from the oven and allow the stretched sample to cool at room temperature (70° F. ±5° F.) for 60 minutes.
(7) Remove the sample from the fixture and place the sample on a smooth wooden or cardboard surface. Release the sample gently.
(8) After the sample has been out of the fixture for 30 minutes (±2 minutes), measure and record the distance between the bench marks.
(9) The calculation is as follows:

$$\text{The permanent set } \% = \frac{100(rl - ol)}{tl - ol}$$

$rl$ = relaxed length (distance between bench marks after cooling)
$ol$ = original length (1.00 inch)
$tl$ = test length (2.00 inch)

The large expansion ratio makes possible a greater wall thickness. Current PSTs cannot employ a thick wall due to the inner core potentially being crushed from the stress created by the PST. If a thick wall is required, a very strong material is required for the core. The core is often made from a tough polymeric material such as flexible cellulose acetate butyrate, polyvinyl chloride or polypropylene. The core may be formed by spirally wrapping an extruded ribbon and fusing or tacking at spaced points along the ribbon to form a rigid core which supports the PST. The core is thereafter removed by pulling one free end of the ribbon core with sufficient force to separate the ribbon where it is tacked such that it becomes unwound. This permits the cover to relax onto an inserted cable or pipe, which leaves the PST tightly affixed over the cable or pipe.

The following Table shows Samples A, B, and C which were similar in all respects except for the amount of oil in the samples. The properties were measured and it can be seen that the 300% modulus and the tensile break strength diminished significantly as the amount of oil increased. At the same time, the ability of the elastomer to recover, as indicated by the change in permanent set, is adversely affected by increasing the amount of processing oil. If the permanent set values increase much above about 20%, their value in PST applications is diminished. The problems observed from excess oil added to the materials include oil bleeding out from the rubber, gas generation during curing, and retardation of the cure system.

TABLE 1

|  | Sample A | Sample B | Sample C |
|---|---|---|---|
| Oil Loading, parts per hundred resin (PHR) | 70 | 120 | 140 |
| Properties: | | | |
| Harness, Shore A | 46 | 34 | 29 |
| 300% modulus, psi | 660 | 300 | 210 |
| Elongation, % | 670 | 850 | 930 |
| Tensile @ break, psi | 1578 | 1295 | 1056 |
| Permanent Set % | 13 | 21 | 29 |

The technique used in the present invention remedies the above-mentioned oil problems by the following:
(1) using lower volatility plasticizers to replace part of the process oil;
(2) using polymer bound oil which has a higher compatibility level than free oil;
(3) using more peroxide or coagents to compensate for the effects of the oil.

Using more peroxide to improve cure has to be done with caution due to excess peroxide tending to increase the modulus and hardness and reduce the elongation drastically, all of which are not desirable for making a high stretch, low hardness compound.

Example 1 is a typical formulation of a low modulus EPDM compound: The formulation uses an oil-extended EPDM rubber ("Polysar" XC-955), together with a regular EPDM rubber ("Nordel" 1470) and the proper selection of other ingredients including process oil, polymeric plasticizer (polybutene), peroxide curative, lead oxide, fungicide, processing aids, antioxidants and coupling agents.

| Chemical | Example 1 Phr | Note |
|---|---|---|
| "Polysar" XC-955 | 120 | Oil-extended EPDM rubber |
| "Nordel" 1470 | 40 | EPDM rubber |
| "Hisil" 532 EP | 20 | Precipitated Hydrated Silica |
| "Sunpar" 2280 | 60 | Paraffinic Petroleum Oil |
| Zinc Oxide | 5 | Zinc Oxide |
| "Agerite" White | 0.8 | Antioxidant |
| "Ultranox" 257 | 1.5 | Antioxidant |
| "Struktol" WB-16 | 2 | Mixture of Calcium Fatty Acids |
| Red Lead | 4 | Red Lead Oxide, $Pb_3O_4$ |
| "Furnex" N754 | 30 | Carbon Black |
| "Vinyzene" SB-1 ELV | 1.5 | Fungicide |
| "Hydral" 710 | 45 | Aluminum Trihydrate |
| "Ucarcil" RC-1 | 1 | Organic Silane |
| "SR-297" | 6 | 1,3-Butylene Glycol Dimethacrylate |
| "Indopol" H-300 | 10 | Polybutene |
| "Vulcup" 40 KE | 10 | $\alpha,\alpha'$-bis(t-butylperoxy) Diisopropylbenzene on Burgess KE Clay |

The following Table shows a comparison of the low hardness rubber of Example 1 compared to a commercially available PST rubber.

TABLE 2

The Comparison of Physical Properties of Low Hardness Rubber (Example 1) with a Typical PST Rubber

| Properties | Low Hardness Rubber (Example 1) | Typical PST Rubber |
|---|---|---|
| Hardness, Shore A | 28 | 46 |
| 100% Modulus, psi | 80 | 160 |
| 200% Modulus, psi | 110 | 370 |
| 300% Modulus, psi | 145 | 680 |
| 500% Modulus, psi | 260 | — |
| 700% Modulus, psi | 420 | — |
| 900% Modulus, psi | 620 | — |
| Tensile strength, psi | 1290 | 1600 |
| Elongation @ break | 1090 | 680 |
| 100% Permanent Set, % | 13.0 | 13.0 |
| Die C Tear, ppi | 105 | 200 |
| Diele Strength v/mil | 580 | 400 |
| Diele Const. @ 1500 V | 3.7 | 5.4 |
| Dissipation factor | 0.015 | 0.045 |

Table 2 shows the properties of the low modulus compound of Example 1 compared to a typical PST compound. The typical PST compound has a Shore A hardness of 46. The low modulus compound has a 28 Shore A hardness. Modulus values listed in Table 2 give a good comparison between extensibility of the two rubbers. The data indicate the force required to stretch a typical PST rubber to 300% is enough to stretch a low modulus rubber more than 900%. The ultimate elongation of the low modulus formulation is about 1.5 times more than the typical PST. If this factor is taken into account, the true tensile strength at the breaking point of the Example 1 rubber is greater than the typical PST rubber. The permanent set value demonstrates that the Example 1 rubber has almost the same elastic recovery as a typical PST rubber. The low modulus rubber also shows better electrical performance as compared to a typical PST rubber. The dielectric strength of Example 1 is above 450 V/mil, which is preferable.

FIG. 1 shows the stress strain curve of EPDM rubbers with various hardnesses. The different curves represent different Shore A hardnesses. The following are the various curves and their associated values.

| Curve | Shore A Hardness |
|---|---|
| A | 78 |
| B | 45 |
| C | 35 |
| D | 30 |
| E | 28 |

The figure is a good representation of how easily the material can be elongated. A 78 Shore A rubber is not easily stretched and will break at less than 300% elongation. A 45 Shore A rubber is a typical PST compound. It has a modulus and elongation range that makes it extensible and allows it to be maintained in an expanded shape without breaking. The curves show how the modulus and elongation change with the change of hardness. As the curves indicate, the low hardness rubbers have very low modulus and greater elongation which allows them to be easily expanded to a much greater degree than the high hardness rubbers.

The low modulus, high stretch rubbers exhibit several outstanding characteristics that are very critical to PSTs. One is the ability to be loaded on a core and remain in a high degree of extension for a long period of time without splitting or breaking apart. Another is substantial elastic recovery after being stretched for a long period of time. Since a PST will be in an expanded state during storage before it is used, it has to be resistant against splitting on the core or collapsing the core before it is used. In order to ascertain whether the tubing will split or collapse during storage, a test to simulate long-term storage of the PST was developed. The test is performed by expanding the tube radially to a certain degree of extension and thereafter loading the tube on a plastic core. The stretch ratio is determined, for example, by loading a 0.4" I.D. tubing on a 2" O.D. plastic core. The resulting stretch ratio is 4:1, and, for example, if placed on a 2.4" core, a 5:1 stretch ratio is achieved. The core loaded tubing is then placed in an oven pre-set at 60° C. The tubing is thereafter constantly inspected to see if splitting has occurred.

The following Table 3 shows the splitting results.

TABLE 3

| Characteristics | Regular PST | High stretch PST (formula shown in Example 1) |
|---|---|---|
| Shore A Hardness | 46 | 29 |
| Permanent Set % | 13 | 13 |

| Oven Split Test (Number of tubes split out of a total of 4 tubes) | | |
|---|---|---|
| | Number of Tubes Split | |
| Stretch ratio | Regular PST | High Stretch PST |
| 3:1 | 0 | 0 |
| 4:1 | 4 | 0 |
| 5:1 | 4* | 0 |

*4 Tubes split and/or the cores collapsed

The results from Table 3 indicate regular PST can be stretched to a 3:1 stretch ratio and survive the oven test, at 4:1 the tube splits rapidly, and, if stretched to 5:1, the tube splits or the core collapses. The high stretch PST of this invention can be stretched beyond about a 5:1 stretch ratio without splitting or collapsing the core due to its high expansion capability and its low modulus.

Also shown in Table 3 is the high stretch PST having a permanent set property as good as regular PST. Permanent set is a measure of elastic recovery of an elastomeric material. The permanent set is a very important property and indicates the final dimensions of the tubing after the core is removed. The tubing will often be subjected to high stretch (e.g., 5:1) and stored for long periods of time. Thus, to ensure a proper fit of the PST, the permanent set should not exceed 20%.

Examples 2 and 3 show formulations omitting a no-oil-extended EPDM rubber. The properties of Examples 2 and 3 are not satisfactory for low-hardness rubbers. Example 3 meets every requirement except the permanent set is high. Example 2 shows excellent elastic recovery, but insufficient elongation.

| Chemical | Example 2 Phr | Example 3 Phr | NOTE |
|---|---|---|---|
| "Polysar" XC-955 | 200 | — | Oil-extended EPDM rubber |
| "Epsyn" N997 | — | 200 | Oil-extended EPDM rubber |
| "Statex" N550 | 30 | 40 | Carbon Black |
| "Hisil" 532 EP | 35 | 25 | Precipitated Hydrated Silica |
| "Sunpar" 2280 | 50 | 30 | Paraffinic Petroleum Oil |
| Zinc Oxide | 5 | 5 | Zinc Oxide |
| "Agerite" MA | 1.25 | 1.25 | Polymerized 1,2-Dihydro-2,2,4-trimethylquinoline |
| "Factice" | 20 | 30 | Vulcanized vegetable oil |
| "Struktol" WB-16 | 2 | 2 | Mixture of Calcium Fatty Acids |
| "TRD" 90 | 4 | 4 | Red lead |
| "Ucarcil" RC-1 | 1 | 1 | Organic Silane |
| "SR-297" | 8 | 6.5 | 1,3-Butylene Glycol Dimethacrylate |
| "Dicup" 40 KE | 16 | 0 | Dicumyl Peroxide on Burgess KE Clay |
| "Vulcup" 40 KE | 12 | 1.0 | α,α' bis (t-butylperoxy) Diisopropylbenzene on Burgess KE Clay |

| Properties | Example 2 | Example 3 |
|---|---|---|
| Hardness, Shore A | 30 | 28 |
| 100% Modulus, psi | 66 | 79 |
| 200% Modulus, psi | 123 | 125 |
| 300% Modulus, psi | 233 | 202 |
| Tensile strength, psi | 1065 | 1387 |
| Elongation @ break | 821 | 881 |
| Permanent Set, % | 15.1 | 31.3 |
| Die C Tear, ppi | 99 | 103 |
| Diele. Strength, V/mil | 448 | 256 |
| Diele. Constant | 4.1 | 5.3 |
| Dissipation factor | 0.024 | 0.036 |

As shown in the following Examples 4 and 5, by using a different proportion of the EPDM polymer and the oil-extended EPDM polymer from Example 1, the desired properties of the low modulus rubber can be achieved by balancing the amount of silica, carbon black, processing oil and polymeric plasticizer. Both Examples 4 and 5 exhibit low modulus, low hardness, high elongation and good elastic recovery properties. Example 5 contains just a trace of carbon black which is used as a coloring compound. A non-black, low hardness rubber can be made by replacing the carbon black with precipitated hydrated silica.

| Chemical | Example 4 Phr | Example 5 Phr | Note |
|---|---|---|---|
| "Polysar" XC-955 | 50 | 80 | Oil-extended EPDM rubber |
| "Nordel" 1470 | 75 | 60 | EPDM rubber |
| "Furnex" N754 | 30 | 0.3 | Carbon Black |
| "Hisil" 532EP | 20 | 45 | Precipitated Hydrated Silica |
| "Sunpar" 2280 | 65 | 60 | Paraffinic Petroleum Oil |
| Zinc Oxide | 5 | 5 | Zinc Oxide |
| "PLX" 841 | 1 | 1 | Antioxidant blend |
| "Ultranox" 257 | 1.5 | 1.5 | Antioxidant |
| Red Lead | 4 | 4 | Red Lead $Pb_3O_4$ |
| "Struktol" WB-16 | 2 | 2 | Mixture oxide of Calcium Fatty Acids |
| "Vinyzene" SB-1 ELV | 1.5 | 1.5 | Fungicide |
| "Hydral" 710 | 40 | 60 | Aluminum trihydrate |
| "Ucarcil" RC-1 | 1 | 1 | Organic Silane |
| "SR-297" | 6 | 6 | 1,3-Butylene Glycol Dimethacrylate |
| "Indopol" H-300 | 20 | 15 | Polybutene |
| "Vulcup" 40 KE | 9 | 9 | α,α'-bis (t-butylperoxy) Diisopropylbenzene on Burgess KE Clay |

| Properties | Example 4 | Example 5 |
|---|---|---|
| Hardness, Shore A | 30 | 29 |
| 100% Modulus, psi | 83 | 70 |
| 200% Modulus, psi | 125 | 105 |
| 300% Modulus, psi | 180 | 140 |
| 500% Modulus, psi | — | 250 |
| 700% Modulus, psi | — | 410 |
| Tensile strength, psi | 1250 | 1190 |
| Elongation @ break | 1028 | 1000 |
| 100% Permanent Set, % | 12.9 | 12.9 |
| Die C Tear, ppi | 113 | 93 |
| Diele. Strength V/mil | 537 | 487 |
| Diele. Constant @ 1500 V | 3.4 | 2.5 |
| Dissipation factor | 0.018 | 0.017 |

Although the elastic material of the present invention is developed mainly for cable accessory and splicing applications, the materials, because of their excellent expansion ratio as well as elastic recovery, may find many applications in the utility, aerospace, household, sports, games, toys or automotive industries.

Other uses for the elastomeric material include environmental protection for screwed cable fittings, knurled or hex nuts on flanges, flared or ferruled fittings, fittings for electrical plugs and cords, bayonet or screwed lamp bases, electrical junctions, sockets or fuses, junctions, splices, or adjoining sleeve fittings for pipes transporting natural gas, water, or other gasses or liquids. Uses also include seals or gaskets, glands, faucets, valves or other m echanical couplings or splices.

When the elastic material of the present invention is used as a sleeve for supporting cables, the sleeve is normally cylindrical both for the ease of manufacture and for maximum utility. Tubular structures of non-uniform diameter are also contemplated as coming within the purview of the invention, a specific example being a conical structure for use as an endcap on a cable termination.

In view of the foregoing description, it will be apparent that the invention is not limited to the specific details set forth herein for purposes of illustration, and that various other modifications are equivalent for the stated and illustrated functions without departing from the spirit of the invention in the scope thereof as defined in the appended claims.

What is claimed is:

1. An article comprising an elastomeric tubular member supported in a stretched condition on an easily removable core, said tubular member comprising:

(a) about 10 to 50 weight percent of an oil-extended ethylene propylene diene monomer rubber, (b) about 5 to 25 weight percent of an elastomer selected from the group consisting of a nonoil-extended ethylene propylene diene monomer rubber and nonoil-extended ethylene propylene
(c) about 5 to 15 weight percent of an extender,
(d) about 10 to 30 weight percent of a processing oil,
(e) about 2 to 30 weight percent of silica, and
(f) up to about 30 weight percent of a polymeric plasticizer.

2. The article of claim 1 wherein said extender is aluminum trihydrate.

3. The article of claim 1 further containing up to about 35 weight percent carbon black.

4. The article of claim 1 having a Shore A hardness value below about 33.

5. The article of claim 1 having a 300% stretch modulus at below about 220 pounds per square inch.

6. The article of claim 1 being capable of elongation over about 900%.

7. The article of claim 1 having a tensile strength of over 1000 pounds per square inch.

8. The article of claim 1 further containing about 1 to 5 weight percent of peroxide as a curing agent.

9. The article of claim 1 having a dielectric strength above about 450 V/mil.

10. The article of claim 1 having an expansion ratio of about 5 to 1.

11. The article of claim 1 having a permanent set of less than about 20%.

12. The article of claim 1 wherein said processing oil is a paraffinic petroleum oil.

13. An article comprising an elastomeric tubular member supported in a stretched condition on an easily removable core, said tubular member comprising:

(a) about 10 to 50 weight percent of an oil-extended ethylene propylene rubber,
(b) about 5 to 25 weight percent of an elastomer selected from the group consisting of a nonoil-extended ethylene propylene diene monomer rubber and nonoil-extended ethylene propylene rubber,
(c) about 5 to 15 weight percent of an extender,
(d) about 10 to 30 weight percent of a processing oil,
(e) about 2 to 30 weight percent of silica, and
(f) up to about 30 weight percent of a polymeric plasticizer.

14. A process for manufacturing an article comprising an elastomeric tubular member supported in a stretched condition on an easily removable core, said process comprising the steps of:

(a) mixing about 5 to 25 weight percent of an elastomer selected from the group consisting of a nonoil-extended ethylene propylene diene monomer rubber and nonoil-extended ethylene propylene rubber with about 2 to 30 weight percent resin of precipitated silica,
(b) adding about 10 to 50 weight percent of an oil-extended ethylene propylene diene monomer rubber,
(c) adding a sufficient amount of a curative,
(d) heating said mixture to a temperature below the decomposition temperature of said curative,
(e) forming said mixture into an V appropriate shape,
(f) allowing said mixture to cure into a solid composition, and
(g) loading said solid composition on an easily removable core.

15. The process of claim 14 wherein said curative is added in an amount of about 1 to 5 weight percent of a peroxide.

* * * * *

UNITED STATES PATENT AND TRADEMARK OFFICE
CERTIFICATE OF CORRECTION

PATENT NO.    :   5,080,942

DATED         :   01/14/92

INVENTOR(S)   :   Steven D. Yau

It is certified that error appears in the above-identified patent and that said Letters Patent is hereby corrected as shown below:

Column 1, Line 13, correct spelling of "Descriotion" to read -- Description --

Column 2, Line 40, "about 3" should read -- about 33 --

Column 4, Line 46, number "a,a'-bis(t-butylperoxy)..." as -- (8) --

Column 9, Line 43, "Permanent Set, %" should read -- 100% Permanent Set, % --

Column 11, Line 4, "ethylene propylene" should read -- ethylene propylene rubber --

Column 12, Line 29, "an V appropriate" should read -- an appropriate --

Signed and Sealed this

Fifteenth Day of June, 1993

Attest:

MICHAEL K. KIRK

*Attesting Officer*     Acting Commissioner of Patents and Trademarks